United States Patent [19]

Danielson et al.

[11] 4,255,198
[45] Mar. 10, 1981

[54] GLASS FOR SEALING TO MOLYBDENUM METAL

[75] Inventors: Paul S. Danielson, Big Flats; William H. Dumbaugh, Jr.; Henry E. Hagy, both of Painted Post, all of N.Y.

[73] Assignee: Corning Glass Works, Corning, N.Y.

[21] Appl. No.: 92,698

[22] Filed: Nov. 9, 1979

[51] Int. Cl.³ .......................... C03C 3/04; C03C 3/10; C03C 3/30
[52] U.S. Cl. ...................................... 106/52
[58] Field of Search ......................... 106/52

[56] References Cited

U.S. PATENT DOCUMENTS

| | | | |
|---|---|---|---|
| 3,496,401 | 2/1970 | Dumbaugh, Jr. | 106/52 |
| 3,927,238 | 12/1975 | DiMarcello | 106/52 |
| 3,978,362 | 8/1976 | Dumbaugh, Jr. et al. | 106/52 |
| 4,012,263 | 3/1977 | Shell | 106/52 |
| 4,060,423 | 11/1977 | Thomas | 106/52 |
| 4,180,618 | 12/1979 | Alpha et al. | 106/52 |

Primary Examiner—O. R. Vertiz
Assistant Examiner—Mark Bell
Attorney, Agent, or Firm—Clinton S. Janes, Jr.

[57] ABSTRACT

This invention is directed to the production of glasses having particular utility as envelopes for tungsten-halogen incandescent lamps because of their thermal endurance and capability of use at the high temperatures at which such lamps operate, coupled with their facility for being sealed to molybdenum. The glasses manifest a strain point in excess of 730° C., a liquidus temperature less than 1200° C., a viscosity at the liquidus of at least 40,000 poises, axial compression at room temperature not exceeding 350 PPM and axial tension or compression at 500° C. not exceeding 150 PPM when sealed to molybdenum leads, and a coefficient of thermal expansion (0°–300° C.) less than $48 \times 10^{-7}/°$ C. Such glasses consist essentially, by weight on the oxide basis, of 61–65% $SiO_2$, 14–17% $Al_2O_3$, 8–15% CaO, and 6–9% SrO.

1 Claim, 4 Drawing Figures

GLASS FOR SEALING TO MOLYBDENUM METAL

BACKGROUND OF THE INVENTION

U.S. Pat. No. 3,496,401 described the basic mechanism underlying the operation of tungsten-halogen incandescent lamps with specific reference to tungsten-iodide lamps. The thrust of that patent was to provide alkaline earth metal aluminosilicate glass compositions which would be suitable as envelopes for such lamps. Those glasses consisted essentially, expressed in weight percent on the oxide basis, of 10-25% alkaline earth metal oxide, 13-25% $Al_2O_3$, 55-70% $SiO_2$, 0-10% $B_2O_3$, and less than 0.1% alkali metal oxide.

U.S. Pat. No. 3,978,362 disclosed an improvement upon the glass compositions recited in the above patent such as to render them especially useful as envelopes for tungsten-bromine incandescent lamps. Thus, the glasses exhibited a strain point above 700° C., a coefficient of thermal expansion (0°-300° C.) of about $48-55 \times 10^{-7}$/°C., a mismatch with molybdenum metal at the set point of the glass not exceeding about 250 PPM (parts per million), an operable melting temperature no higher than 1550° C., a viscosity at the liquidus of at least 100,000 poises, and a liquidus temperature less than 1200° C. Glasses demonstrating those properties consisted essentially, expressed in weight percent on the oxide basis, of about 14-21% CaO, 0-5% MgO, 0-7% BaO, the total CaO+MgO+BaO being at least 19%, 13-16% $Al_2O_3$, 0-10% SrO and/or $La_2O_3$, and 58-63% $SiO_2$.

U.S. Pat. No. 4,060,423 described another group of glass compositions particularly designed for use as envelopes for tungsten-halogen lamps. Those glasses are characterized as exhibiting a liquidus temperature no greater than 1250° C., a strain point of at least 725° C., and a coefficient of thermal expansion (0°-300° C.) of about $42-48 \times 10^{-7}$/°C. The compositions therefor consist essentially, expressed in weight percent on the oxide basis, of 55-68% $SiO_2$, 15-18% $Al_2O_3$, 6-13% CaO, and 6-16% BaO, wherein the weight ratio $Al_2O_3$:CaO+BaO is about 0.6:1 to 1:1.

SUMMARY OF THE INVENTION

Substantial increases in the thermal endurance and the safe maximum operating temperatures exhibited by glasses utilized as envelopes for tungsten-halogen incandescent lamps have been sought for two reasons. First, the use of two-filament lamps has increased the energy input to the lamps and, hence, has raised the operating temperature thereof. Second, for any specific power input, a higher temperature capability in the glass permits the use of smaller diameter envelopes, resulting in smaller overall lamp dimensions.

The appropriate glass for high energy, tungsten-halogen lamp envelopes must demonstrate a necessary combination of physical properties, coupled with good melting and forming facility thereby commending their ready compliance with standard commercial production methods, which will only be found within a limited range of glass compositions. For example, the liquidus-viscosity relationship should be such as to allow tube forming by the Vello process, i.e., the glass must exhibit a viscosity at the liquidus of at least 40,000 poises. Also, the liquidus temperature will not exceed 1200° C. The temperature capability requirements of the envelope translate to the need for a glass strain point of at least 730° C., the higher the more desirable. The seals to the molybdenum metal leads into the envelope place the glass in axial compression at room temperature, this compression, however, not exceeding about 350 PPM and, preferably, less than 300 PPM.

Experience has shown that radial-tangential stresses associated with glass-wire seals are of little practical moment but axial stresses are a very important consideration. Cylindrical bead seals have been prepared in the laboratory between molybdenum wires and glasses, and thereafter analyzed photoelastically as a function of temperature. Thus, such seals are heated to temperatures slightly above that at which stress retardation goes to zero and remains at that figure upon further heating. That temperature is about 50° C. above the annealing point of the glass. The seal is subsequently cooled at a controlled moderate rate (about 300° C./hour) to a temperature at least 100° C. below the strain point of the glass, after which cooling is accelerated and control thereof is not necessary. Optical retardation is measured at the glass-wire interface with a light path normal to the wire axis at a sufficient number of arbitrarily selected temperatures during the controlled cooling step to describe a curve such as is depicted in FIGS. 1-4. The optical retardation data can be employed to calculate the total expansion differential (mismatch) at any temperature. The testing method employed is a modification of ASTM Designation F14, *Making and Testing Reference Glass-Metal Bead-Seal*, wherein a furnace is employed to raise the temperature of the test specimens.

As is evident from FIGS. 1-4, when the seal is cooled, tensile stresses are initially set up therein. However, as the cooling is continued, the tensile stresses become less until a crossover point is reached and compressive stresses are developed. Inasmuch as the temperature of the base of tungsten-halogen lamps approaches 500° C. during operation, it is desirable that the crossover point be at as high a temperature as possible. In any event, the negative mismatch at 500° C., placing the glass into axial tension, ought not to exceed about 150 PPM and, preferably, will be no greater than about 100 PPM. These sealing requirements translate to coefficients of thermal expansion (0°-300° C.) of less than $48 \times 10^{-7}$/°C., but generally greater than $43 \times 10^{-7}$, for glasses having strain points between about 730°-750° C.

The glasses of the present invention consist essentially, expressed in weight percent on the oxide basis, of 61-65% $SiO_2$, 14-17% $Al_2O_3$, 8-15% CaO, and 6-9% SrO, with the preferred ranges consisting essentially of 62-64% $SiO_2$, 14-16% $Al_2O_3$, 10-13% CaO, and 7-9% SrO.

As has been explained above in the discussion of the prior art, the presence of alkali metal oxides is to be avoided. The most desirable properties are found in those glasses consisting essentially solely of the four components $SiO_2$, $Al_2O_3$, CaO, and SrO, although minor amounts, less than 5% by weight, of MgO and BaO can be tolerated. Both of those constituents aid the melting and forming characteristics of the glass but also tend to reduce the strain point thereof, thereby decreasing the high temperature capability of the glasses. Moreover, the inclusion of MgO dramatically raises the liquidus temperatures of the glass.

DESCRIPTION OF THE PREFERRED EMBODIMENTS

Figure 1:
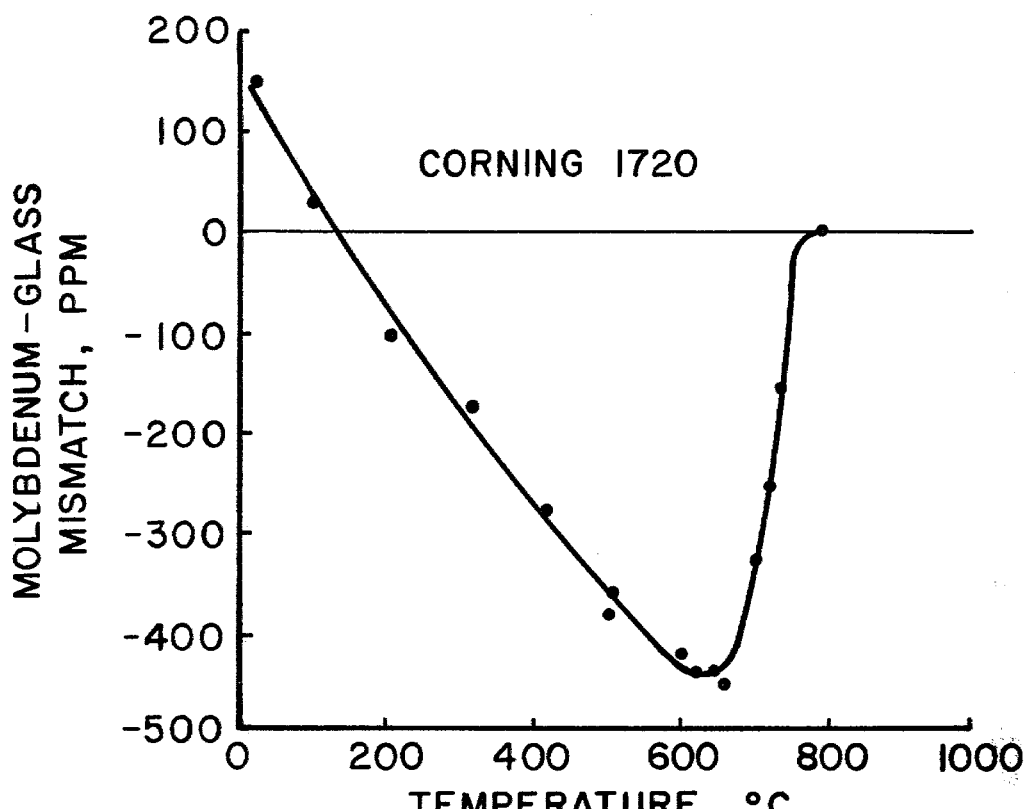
FIG. 1 depicts the curve generated through optical retardation measurements determined with respect to Corning Code 1720 glass.

Table I records several glass compositions, expressed in parts by weight on the oxide basis, which can serve to explain the parameters of the instant invention. The actual batch ingredients can be the oxides or other compounds which, when melted together, will be converted into the desired oxide in the proper proportions. For example, $CaCO_3$ can be employed as a source of CaO and $SrCO_3$ as a source of SrO. Inasmuch as the sum of the components totals or approximates 100, for all practical purposes the constituents can be deemed to have been reported in terms of weight percent.

The batch materials were ballmilled together to aid in obtaining a homogeneous melt and then dispensed into a platinum crucible. The crucible was moved to a furnace operating at about 1650° C. and maintained therewithin for about 16 hours. The crucible was then removed from the furnace, emptied into a steel mold to produce a glass slab about 6"×6"×½", and this slab immediately transferred to an annealer operating at about 800° C. (Although the exemplary compositions listed in Table I reflect laboratory melts only, it will be appreciated that larger melts of those glasses can be made in commercial pots or continuous melting units, where desired.)

Table I also records approximate analyses of Corning Code 1720, Corning Code 1776, and General Electric 180 glasses marketed commercially, respectively, by Corning Glass Works, Corning, N.Y., and General Electric, Schenectady, New York, for use as envelopes for tungsten-halogen lamps.

TABLE 1

|  | 1 | 2 | 3 | 1720 | 1776 | 180 |
|---|---|---|---|---|---|---|
| $SiO_2$ | 63.8 | 62.2 | 63.8 | 59.5 | 62.3 | 62.9 |
| $Al_2O_3$ | 15.5 | 15.1 | 15.5 | 17.0 | 14.0 | 16.3 |

TABLE 1-continued

|  | 1 | 2 | 3 | 1720 | 1776 | 180 |
|---|---|---|---|---|---|---|
| MgO | 0.01 | 3.0 | 0.01 | 7.5 | 1.3 | — |
| CaO | 14.9 | 8.3 | 12.8 | 9.8 | 18.2 | 9.1 |
| SrO | 0.06 | 0.04 | 7.9 | — | — | 0.2 |
| BaO | 5.8 | 11.4 | 0.1 | — | 5.2 | 11.6 |
| $B_2O_3$ | — | — | — | 5.2 | — | — |
| $Na_2O$ | — | — | — | 1.1 | — | — |

Table II recites measurements of various physical characteristics of the above-reported glasses determined in accordance with techniques conventional to the glass art. The coefficients of thermal expansion were ascertained over the range of 0°–300° C. and are tabulated in terms of $\times 10^{-7}$/°C. The annealing point (Ann. Pt.), strain point (Str. Pt.), and internal liquidus are recorded in °C. and the viscosity at the liquidus in poises. The expansion mismatch with molybdenum metal at room temperature (~20° C.) and at 500° C. was determined from the curve generated from optical retardation data utilizing the above-described photoelastic analysis of seals prepared with each glass and molybdenum wire. The results are expressed in terms of parts per million (PPM), a + indicating compression stress and a − indicating tensile stress.

TABLE II

|  | 1 | 2 | 3 | 1720 | 1776 | 180 |
|---|---|---|---|---|---|---|
| Ann. Pt. | 797 | 778 | 794 | 712 | 753 | 785 |
| Str. Pt. | 752 | 730 | 749 | 667 | 707 | 732 |
| Coef. Exp. | 47.0 | 44.8 | 47.6 | 42 | 53 | 45.6 |
| Liquidus | 1208 | 1275 | 1177 |  | 1109 |  |
| Viscosity | $7 \times 10^4$ | $2.3 \times 10^4$ | $1.4 \times 10^5$ |  | $1.2 \times 10^5$ |  |
| Mismatch |  |  |  |  |  |  |
| ~20° C. | +280 |  | +210 | +150 | −330 | +460 |
| 500° C. | −100 |  | −130 | −360 | −380 | +30 |

An examination of Table II illustrates the values which render Example 3 the preferred embodiment of the invention. Thus, that glass exhibits a strain point in excess of 730° C., a coefficient of thermal expansion below $48 \times 10^{-7}$/°C., a liquidus temperature below 1200° C., a viscosity at the liquidus greater than $4 \times 10^4$, a mismatch with molybdenum wire at room temperature of less than 350 PPM and a mismatch with molybdenum wire at 500° C. of less than 150 PPM.

Figure 2:
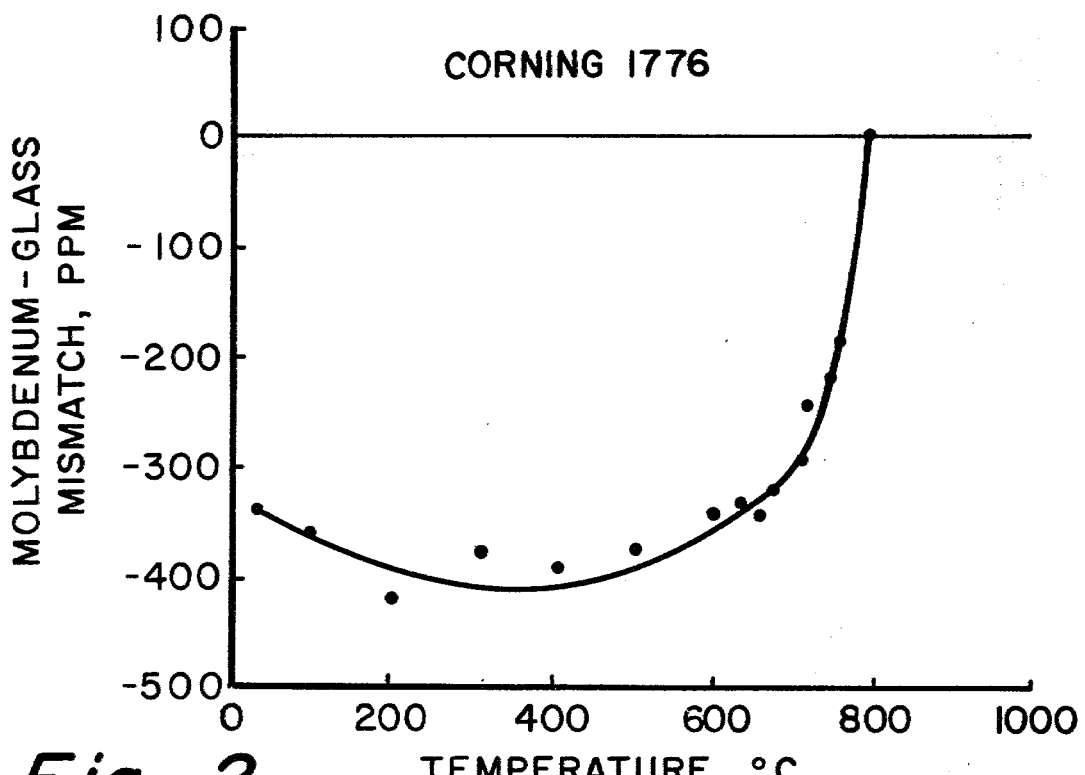
FIG. 2 sets forth the curve derived through optical retardation measurements determined with respect to Corning Code 1776 glass.
Figure 3:
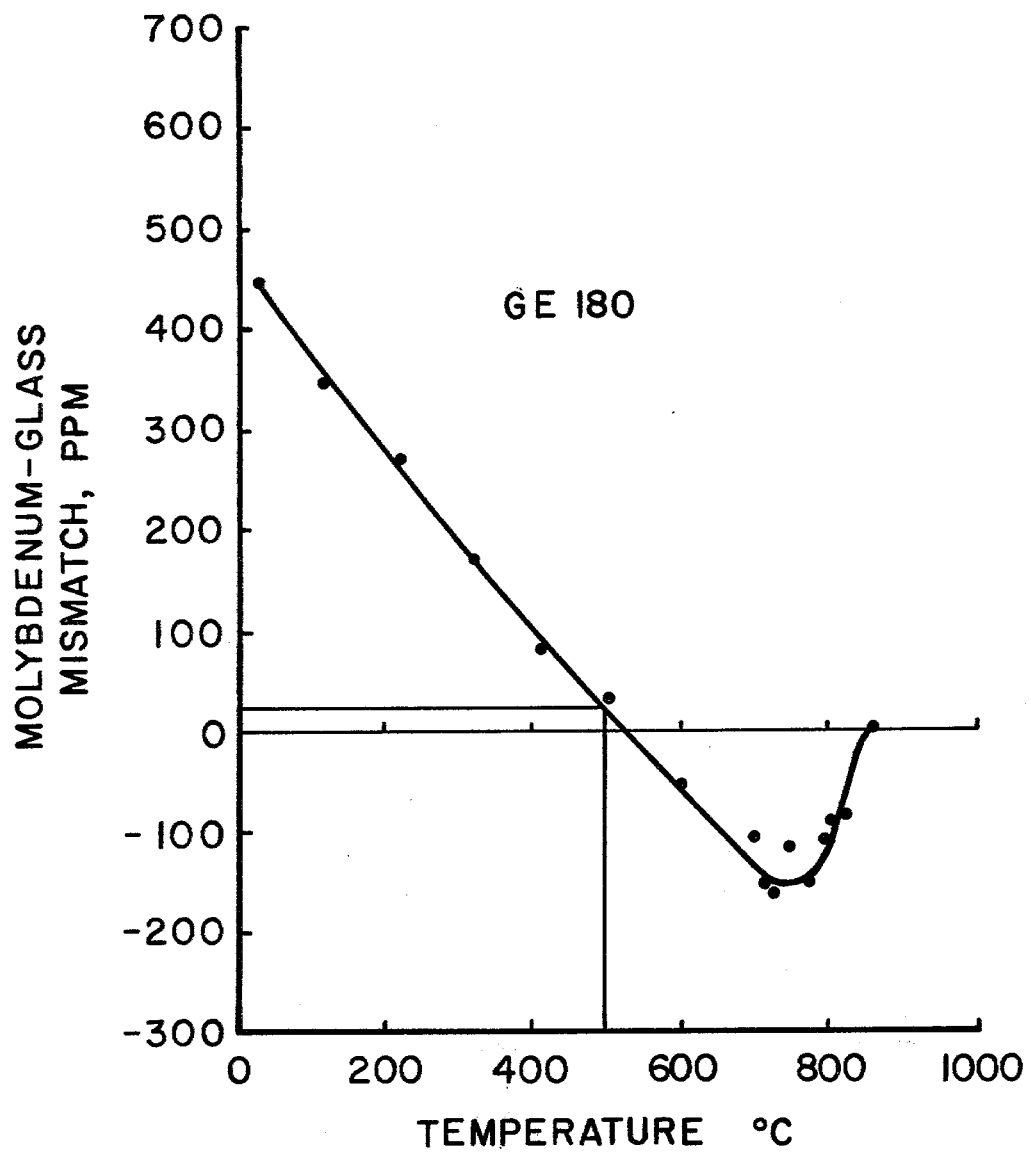
FIG. 3 represents the curve generated through optical retardation measurements determined with respect to General Electric 180 glass.
Figure 4:
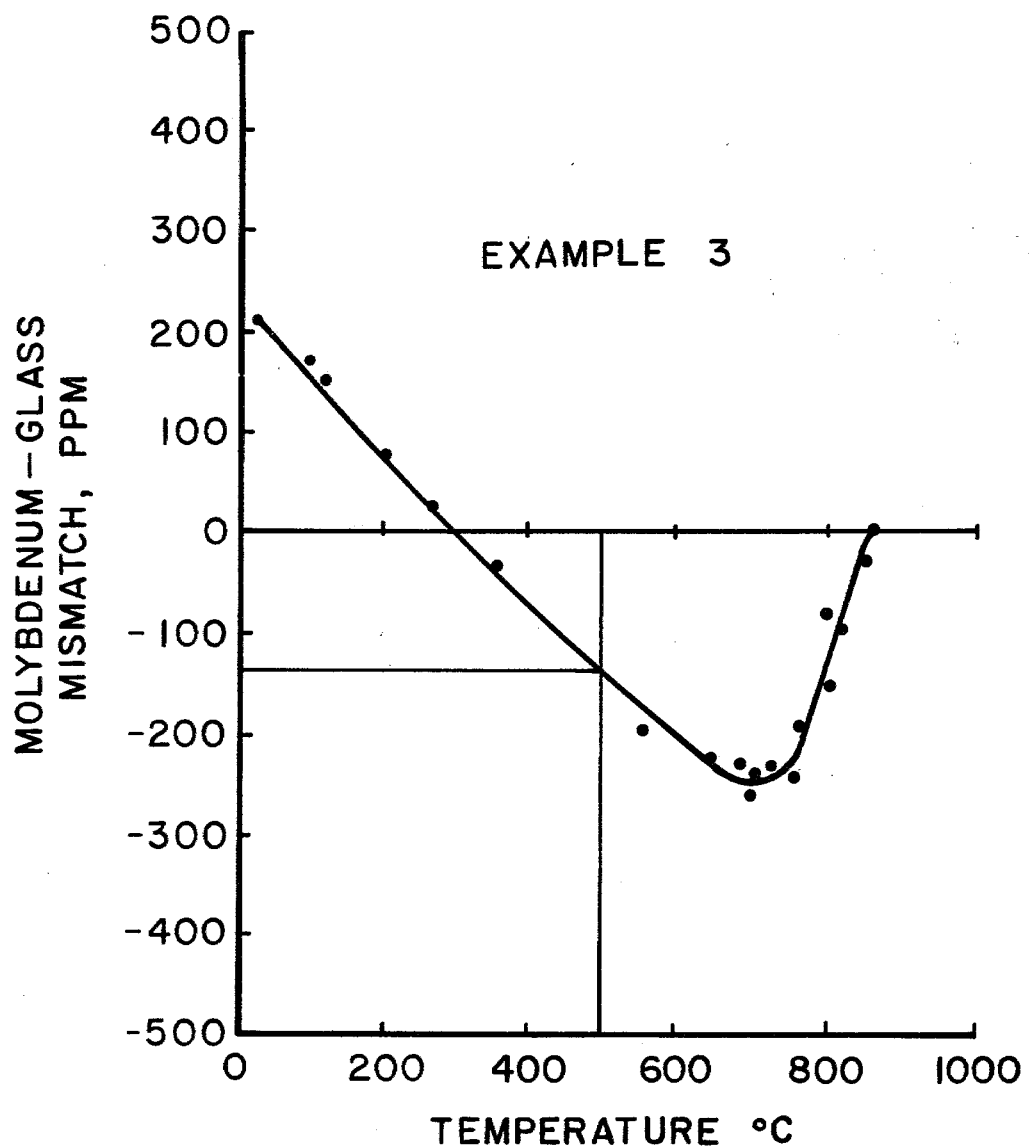
FIG. 4 reports the curve resulting from optical retardation measurements determined with respect to Example 3 of Table I infra.

In contrast, the liquidus values of Examples 1, 2, and Glass 180 are higher than desired and the mismatch levels of Glasses 1720, 1776, and 180 are excessive. Appended FIGS. 1–4 record the curves generated from the optical retardation data measured in Glass 1720 (FIG. 1), Glass 1776 (FIG. 2), Glass 180 (FIG. 3), and Example 3 (FIG. 4).

We claim:

1. A glass composition suitable for sealing to molybdenum metal, said glass exhibiting a strain point in excess of 730° C., a liquidus temperature less than 1200° C., a viscosity at the liquidus of at least 40,000 poises, axial compression at room temperature not exceeding 350 PPM and axial compression or tension not exceeding 150 PPM at 500° C. when sealed to molybdenum metal, a coefficient of thermal expansion (0°–300° C.) less than $48 \times 10^{-7}$/°C., but greater than $43 \times 10^{-7}$/°C., and consisting essentially, in weight percent on the oxide basis, of 62–64% $SiO_2$, 14–16% $Al_2O_3$, 10–13% CaO, and 7–9% SrO.

* * * * *